Dec. 9, 1958     C. W. KELSEY     2,863,542
FLUID SAFETY DRIVE DEVICE

Filed Dec. 13, 1955     3 Sheets-Sheet 1

INVENTOR.
CADWALLADER W. KELSEY

BY *Andros and Smith*

ATTORNEYS

Dec. 9, 1958 C. W. KELSEY 2,863,542
FLUID SAFETY DRIVE DEVICE
Filed Dec. 13, 1955 3 Sheets-Sheet 2
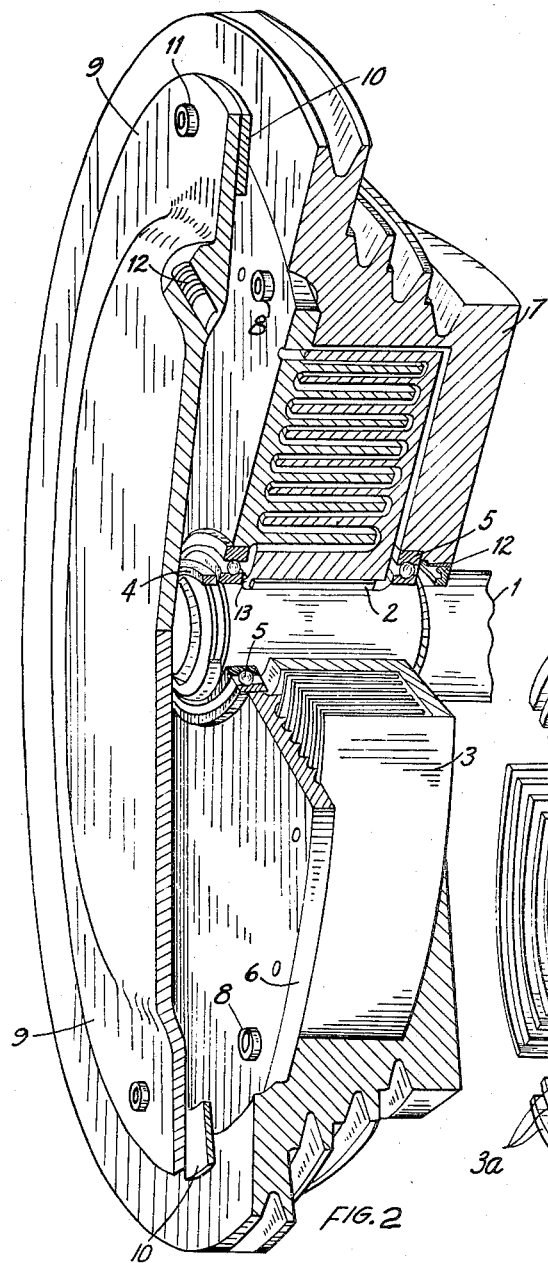
FIG. 2
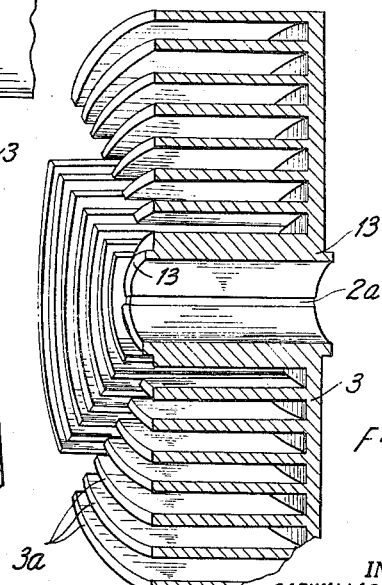
FIG. 3
FIG. 4
INVENTOR.
CADWALLADER W. KELSEY
BY
ATTORNEYS Dec. 9, 1958 C. W. KELSEY 2,863,542
FLUID SAFETY DRIVE DEVICE
Filed Dec. 13, 1955 3 Sheets-Sheet 3

INVENTOR.
CADWALLADER W. KELSEY
BY
ATTORNEYS

United States Patent Office 2,863,542
Patented Dec. 9, 1958

2,863,542

FLUID SAFETY DRIVE DEVICE

Cadwallader W. Kelsey, Troy, N. Y.

Application December 13, 1955, Serial No. 552,736

1 Claim. (Cl. 192—58)

This invention relates to a safety drive element for use in such devices as soil tilling machines having a rotary soil tilling mechanism. These machines are provided with a large and heavy step V-belt pulley on one end of a shaft to drive the rotary tilling mechanism mounted on the other end of the shaft. This pulley has a fly wheel effect in order to keep the rotational speed of the tilling mechanism substantially constant. In using such a machine in soil having stones or roots which become engaged by the tilling machine it has been found necessary to provide a shear pin connection between the pulley and shaft. Such a shear pin must be replaced when it has been destroyed by stoppage of the tilling rotor. The replacement of the shear pin is time consuming and requires the maintenance of a supply of pins.

An object of the present invention is to provide a safety viscosity drive connection between a pulley and shaft which will obviate the need of a shear pin.

A further object of the invention is to provide a shock absorbing or cushion drive connection between pulley and shaft so that rapidly varying loads on the shaft will be absorbed in the connection rather than react with full force against a powerplant driving the pulley.

Other and further objects and advantages of the device will be clear from the following specifications, taken with the accompanying drawing in which like characters of reference refer to like parts in the several views, and in which:

Fig. 2 is a perspective view partially broken away of the pulley of Fig. 1;

Fig. 3 is a perspective view, partially in section, of an element of the device of Fig. 2;

Fig. 4 is a perspective view, partially sectioned, of a different element of the device of Fig. 2;

Figure 1:
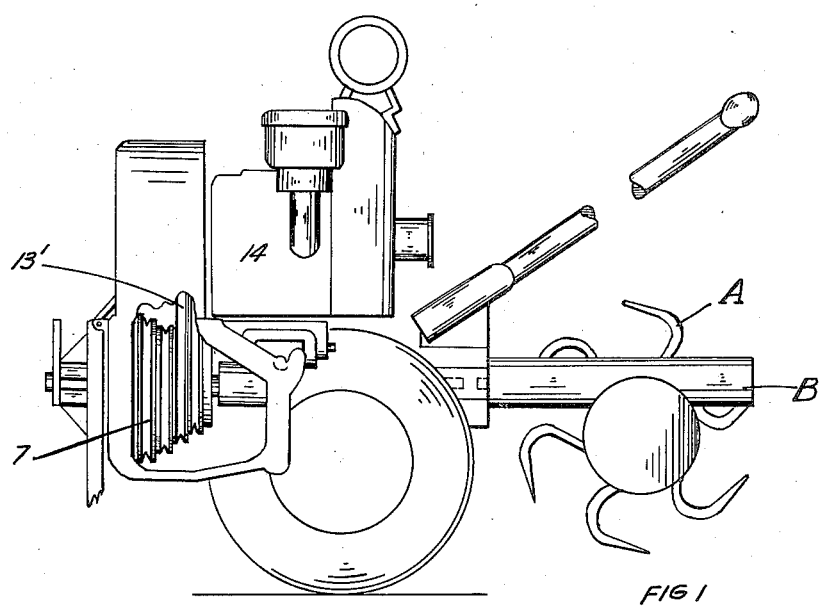
Fig. 1 is a side elevation of a rotary tilling machine, partially broken away to show a V-belt pulley in which the invention is incorporated.

Referring more particularly to the drawing, it will be seen in Fig. 1 that a pulley 7 drives a rotary tilling device A by a shaft extending through a tubular chassis B.

Figure 5:
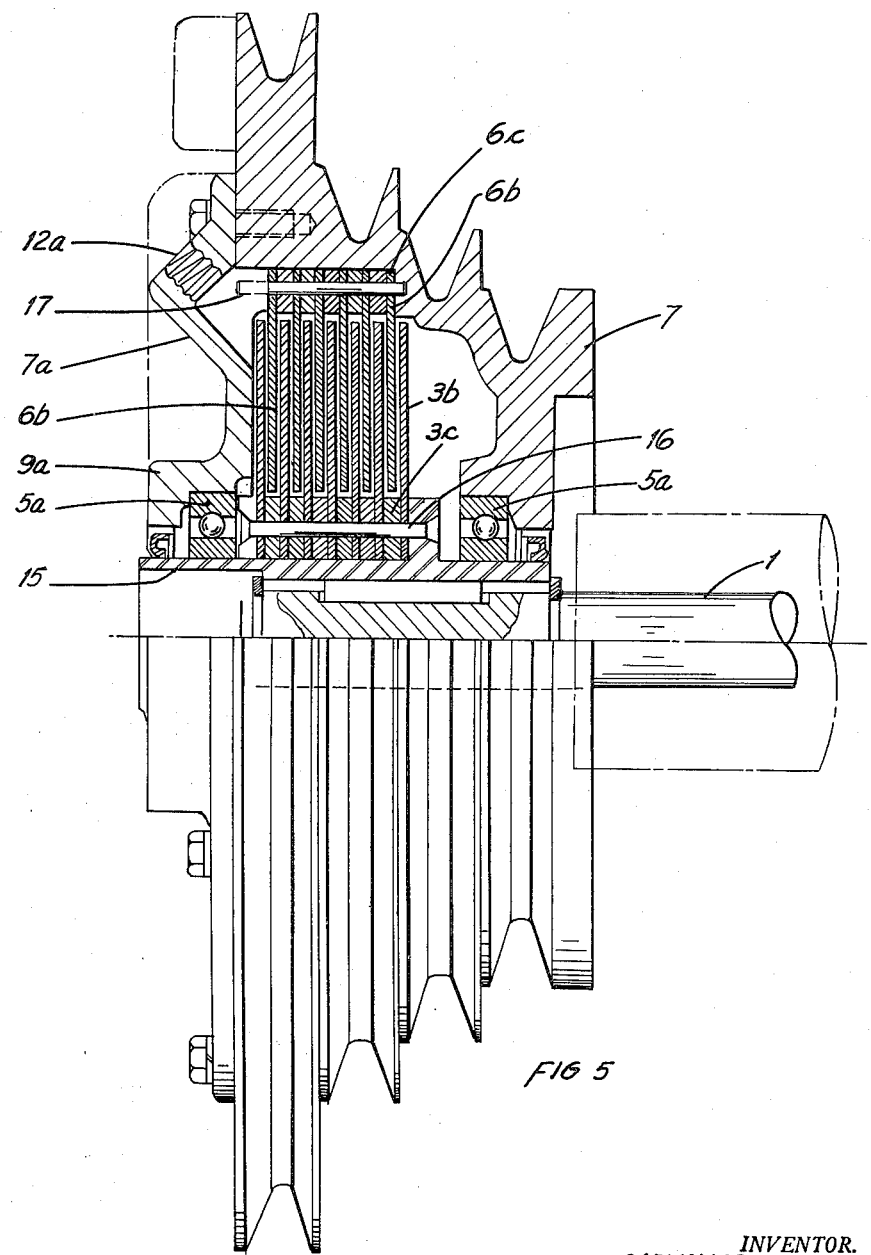
Fig. 5 is an elevation, partially in section, of a modification of the pulley of Fig. 1.

It will be understood from this figure that after the rotary tilling blades A contact an object, such as a tree stump or boulder, it will be impossible for the rotary device to continue in operation and the shaft shown at 1, in Figs. 2 and 5, will be brought to an abrupt stop, while the fly wheel pulley 7 will tend to continue to rotate. It has been the practice to connect the shaft and pulley by means of a shear pin which will be severed when too heavy a blow would otherwise be transmitted from the shaft to the pulley. By the present invention the use of such a pin has been eliminated.

As seen in Fig. 2, the shaft or drive element 1 is rigidly connected by a key 2 to a rotor 3. This rotor, seen also in Fig. 4, is provided with spacing shoulders 13 to position the rotor on the shaft. It is also provided with a plurality of annular cylindrical webs 3a spaced preferably equi-distant from each other.

The pulley or driving means 7 is mounted on the shaft 1, by bearings 5, positioned against shoulders 13 of element 3. The pulley 7 carries an element 6 complementary to the element 3, which is provided with a plurality of annular cylindrical webs 6a, which, in an operative position, are interleaved with the webs 3a of element 3. Element 6 is secured to driving means 7 by a plurality of fastening means 8. A cover plate 9, and gasket 10, may be provided and fastened to the pulley 7 by a plurality of fastenings 11. An opening 12 is provided in the cover plate, through which a viscous fluid may be introduced to fill the space between and surrounding the elements 3a and 6a.

The viscous fluid to be introduced in the device is preferably a silicone, which is a compressible liquid, the viscosity of which is very little effected by temperature changes and which has a shear stability many times that of other liquids.

The spacing between the interleaved cylindrical webs, 3a and 6a, is small. It will be seen, therefore, that the liquid between the webs 3a and 6a is subjected primarily to shear stresses.

In operation a belt 13', shown in Fig. 1, will drive the pulley 7, 6, 6a, from an engine 14 of the machine. The rotating element 6—6a will turn the shaft 1 because of the high resistance to shear of the viscous fluid between webs 3a and 6a. However, upon sudden stopping of the shaft 1, the viscous fluid between the webs will be sheared and the pulley 6, 6a, 7, will continue to rotate. It will be seen, therefore, under such conditions the engine may then be stopped and the obstructions to operation be removed and the machine again put into operation without the need to replace a safety element such as a shear pin.

It also will frequently occur that the ground under tillage will contain obstructions insufficient to bring the rotary element A to a complete stop but will slow the drive considerably, and as soon as the rotary element has cleared itself of the obstruction it will attain speed up. Such fluctuation of speed will adversely affect the operation of the engine 14 if the pulley and shaft are rigidly secured together as has been the custom. The device of Fig. 2, however, will eliminate this unsatisfactory condition because there will be a degree of slippage between the shaft and the pulley when the load of the shaft is suddenly increased.

The device of Fig. 5 operates on the same principle and is the equivalent of the device of Fig. 2. As shown in Fig. 5, however, a sleeve 15 is keyed to the shaft 1, a plurality of disk webs 6b, spaced apart by spacers 6c, which are complementary to and interleaved with webs and spacers 3b and 3c, are mounted in pulley 7. These are held against rotation by a plurality of pins 17. The cover plate 7a both closes the cavity in the pulley and acts as a support for it. Cover plate 7a is provided with an opening 12a for use in filling the device with viscous fluid.

Figure 8:
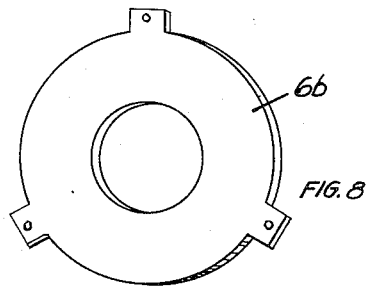
Figs. 6, 7, 8 and 9 are perspective views of elements of the device of Fig. 5.
Figure 6:
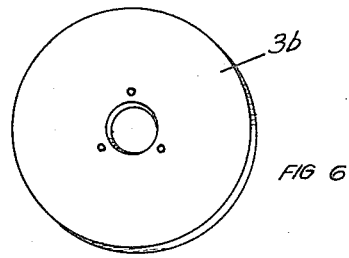
Figure 9:
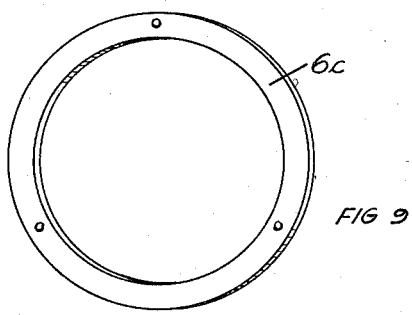
Figure 7:
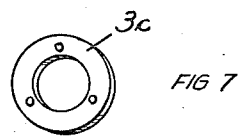

The elements 3b and 3c are illustrated in Figs. 6 and 7 respectively, and elements 6b and 6c are illustrated in Figs. 8 and 9 respectively. It will be understood that these elements are assembled by stacking them in the order in which they are to be mounted on the sleeve 15 and pulley 7.

The operation of the device of Fig. 5 is precisely the same as the operation of the device of Fig. 2. The difference being the use of radial rather than cylindrical shearing surfaces.

While the invention above has been limited to its use between a pulley and shaft of a tilling machine, it will be clear to those skilled in the art that it may equally be used between a gear or other driving element and shaft, or between two gears for driving various machines when it is desired to protect the machinery from damage caused by sudden stoppage of one element or where it is desirable to incorporate a shock absorbing means between the driving and the driven elements.

It will thus be seen that the objects hereinbefore set forth may readily and efficiently be attained and, since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claim is intended to cover all of the generic and specific features of the invention herein described, and all statements of the scope of the invention which, as a matter of language, might be said to fall therebetween.

Having described my invention what I claim as new and desire to secure by Letters Patent is:

A safety drive connection for use on a machine such as a tilling device normally subjected to a high torque and which may be subjected to sudden shock by stoppage of a driven element, said connection including coaxial driving and driven means, a plurality of spaced coaxial webs rigidly mounted on and secured for rotation with said driving means, a plurality of complementary spaced coaxial webs mounted on said driven means and rigidly secured thereto interleaved but out of contact with the webs on said driving means, and a viscous silicone liquid having a high resistance to mechanical shearing filling the spaces between the interleaved webs, said liquid being characterized in that it acts as a liquid shear pin in as much as when subjected to a predetermined stress caused by stoppage of the driven element, the liquid becomes incapable of carrying substantially any part of the load, and which load must be reduced substantially to zero before the liquid is again capable of carrying a load.

References Cited in the file of this patent

UNITED STATES PATENTS

| | | |
|---|---|---|
| 1,238,447 | Severy | Aug. 28, 1917 |
| 1,482,167 | Varley | Jan. 29, 1924 |
| 2,002,629 | Cobb et al. | May 28, 1935 |
| 2,507,182 | Young | May 9, 1950 |
| 2,629,472 | Sterner | Feb. 24, 1953 |
| 2,775,317 | Sinisterra | Dec. 25, 1956 |

FOREIGN PATENTS

| | | |
|---|---|---|
| 1,026,764 | France | Feb. 11, 1953 |

OTHER REFERENCES

G. E. Viscasil reprinted from Product Engineering, July 1954, pages 4, 5 and 6. (On file in Division 31.)

Flow Characteristics of Organopolysiloxane Fluids and Gases reprinted from Industrial and Engineering Chemistry, vol. 42, December 1950, pages 2458 and 2459. (On file in Div. 31.)

Dow Corning Silicone Note Book, Fluid Series #3, September 1948, pages 6 and 7. (On file in Division 60.)

Dow Corning 200 Fluids, Reference No. 2003, June 1952, page 18. (On file in Division 60.)

Silicone Putty for Slip Clutches and Couplings, Product Engineering, October 1953, pages 142–143.